United States Patent
Seo et al.

(10) Patent No.: US 7,587,405 B2
(45) Date of Patent: Sep. 8, 2009

(54) RECORDING MEDIUM AND METHOD AND APPARATUS FOR DECODING TEXT SUBTITLE STREAMS

(75) Inventors: Kang Soo Seo, Anyang-si (KR); Jea Yong Yoo, Seoul (KR); Sung Wan Park, Suwon-si (KR); Young Sun Shim, Seoul (KR); Byung Jin Kim, Seongnam-si (KR); Seung Hoon Lee, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 209 days.

(21) Appl. No.: 11/033,109

(22) Filed: Jan. 12, 2005

(65) Prior Publication Data

US 2005/0198560 A1 Sep. 8, 2005

Related U.S. Application Data

(60) Provisional application No. 60/544,234, filed on Feb. 13, 2004, provisional application No. 60/543,328, filed on Feb. 11, 2004, provisional application No. 60/542,852, filed on Feb. 10, 2004, provisional application No. 60/542,850, filed on Feb. 10, 2004.

(30) Foreign Application Priority Data

Mar. 17, 2004 (KR) .................. 10-2004-0017935

(51) Int. Cl.
 G06F 17/30 (2006.01)
 G06F 7/00 (2006.01)
(52) U.S. Cl. .................. 707/101; 707/102; 707/6
(58) Field of Classification Search .......... 707/101, 707/102, 6
 See application file for complete search history.

(56) References Cited

U.S. PATENT DOCUMENTS

| 3,128,434 | A | 4/1964 | Moreines |
| 5,253,530 | A | 10/1993 | Letcher, III |
| 5,467,142 | A | 11/1995 | Ichinokawa |
| 5,519,443 | A | 5/1996 | Salomon et al. |
| 5,537,151 | A | 7/1996 | Orr et al. |

(Continued)

FOREIGN PATENT DOCUMENTS

CN WO 00/41175 5/2002

(Continued)

OTHER PUBLICATIONS

"Understanding SAMI 1.0", Microsoft Corporation, Feb. 2003.

(Continued)

*Primary Examiner*—Kuen S Lu
(74) *Attorney, Agent, or Firm*—Harness, Dickey & Pierce, P.L.C.

(57) ABSTRACT

At least one text subtitle stream is recorded on a recording medium. Each text subtitle stream includes a dialog style segment defining a set of region styles and at least one dialog presentation segment. Each dialog presentation segment contains at least one region of dialog text and being linked to at least one of the set of region styles. The dialog style segment includes a player style flag which indicates whether a player is permitted to generate its own set of player styles. Then each dialog presentation segment is decoded using the set of player styles if the permission is indicated by the player style flag.

21 Claims, 16 Drawing Sheets

U.S. PATENT DOCUMENTS

| | | | |
|---|---|---|---|
| 5,758,007 A | | 5/1998 | Kitamura et al. |
| 5,781,687 A | * | 7/1998 | Parks ........................... 386/52 |
| 5,832,530 A | * | 11/1998 | Paknad et al. ............... 715/500 |
| 6,009,234 A | | 12/1999 | Taira et al. |
| 6,128,434 A | | 10/2000 | Hirayama et al. |
| 6,148,140 A | | 11/2000 | Okada et al. |
| 6,173,113 B1 | | 1/2001 | Okada et al. |
| 6,204,883 B1 | | 3/2001 | Tsukagoshi |
| 6,219,043 B1 | | 4/2001 | Yogeshwar et al. |
| 6,222,532 B1 | | 4/2001 | Ceccarelli |
| 6,230,295 B1 | | 5/2001 | Watkins |
| 6,253,221 B1 | | 6/2001 | Kim |
| 6,262,775 B1 | | 7/2001 | Kim |
| 6,320,621 B1 | | 11/2001 | Fu |
| 6,393,196 B1 | | 5/2002 | Yamane et al. |
| 6,661,467 B1 | | 12/2003 | Van Der Meer et al. |
| 6,747,920 B2 | | 6/2004 | Denda et al. |
| 6,792,577 B1 | | 9/2004 | Kimoto |
| 7,151,617 B2 | | 12/2006 | Fukushima et al. |
| 7,174,560 B1 | | 2/2007 | Crinon |
| 7,188,353 B1 | | 3/2007 | Crinon |
| 7,370,274 B1 | | 5/2008 | Stuple et al. |
| 2002/0004755 A1 | * | 1/2002 | Balthaser ...................... 705/26 |
| 2002/0010924 A1 | | 1/2002 | Kalhour |
| 2002/0106193 A1 | | 8/2002 | Park et al. |
| 2002/0135608 A1 | | 9/2002 | Hamada et al. |
| 2002/0151992 A1 | * | 10/2002 | Hoffberg et al. .............. 700/83 |
| 2002/0159757 A1 | | 10/2002 | Ando et al. |
| 2002/0194618 A1 | | 12/2002 | Okada et al. |
| 2003/0039472 A1 | | 2/2003 | Kim |
| 2003/0078858 A1 | | 4/2003 | Angelopoulos et al. |
| 2003/0085997 A1 | * | 5/2003 | Takagi et al. ................ 348/143 |
| 2003/0086690 A1 | | 5/2003 | Chung et al. |
| 2003/0099464 A1 | | 5/2003 | Oh et al. |
| 2003/0103604 A1 | | 6/2003 | Kato et al. |
| 2003/0147629 A1 | | 8/2003 | Kikuchi et al. |
| 2003/0188312 A1 | | 10/2003 | Bae et al. |
| 2003/0189571 A1 | | 10/2003 | MacInnis et al. |
| 2003/0189669 A1 | | 10/2003 | Bowser |
| 2003/0190147 A1 | | 10/2003 | Lee |
| 2003/0194211 A1 | * | 10/2003 | Abecassis .................... 386/69 |
| 2003/0202431 A1 | | 10/2003 | Kim et al. |
| 2003/0206553 A1 | | 11/2003 | Surcouf et al. |
| 2003/0216922 A1 | | 11/2003 | Gonzales et al. |
| 2003/0235402 A1 | | 12/2003 | Seo et al. |
| 2003/0235406 A1 | | 12/2003 | Seo et al. |
| 2004/0001699 A1 | | 1/2004 | Seo et al. |
| 2004/0003347 A1 | * | 1/2004 | Saidenberg et al. .......... 715/511 |
| 2004/0027369 A1 | * | 2/2004 | Kellock et al. ............... 345/716 |
| 2004/0047605 A1 | | 3/2004 | Seo et al. |
| 2004/0054771 A1 | | 3/2004 | Roe et al. |
| 2004/0081434 A1 | * | 4/2004 | Jung et al. .................... 386/95 |
| 2004/0151472 A1 | | 8/2004 | Seo et al. |
| 2004/0202454 A1 | | 10/2004 | Kim et al. |
| 2005/0013207 A1 | | 1/2005 | Tsumagari et al. |
| 2005/0105888 A1 | | 5/2005 | Hamada et al. |
| 2005/0147387 A1 | * | 7/2005 | Seo et al. ...................... 386/95 |
| 2006/0013563 A1 | | 1/2006 | Adolph et al. |
| 2006/0098936 A1 | | 5/2006 | Ikeda et al. |
| 2006/0156358 A1 | | 7/2006 | Adolph et al. |
| 2006/0259941 A1 | | 11/2006 | Goldberg et al. |

FOREIGN PATENT DOCUMENTS

| | | |
|---|---|---|
| CN | 1368732 | 9/2002 |
| CN | 1864220 | 11/2006 |
| EP | 0737016 | 10/1996 |
| EP | 0 863 509 A1 | 9/1998 |
| EP | 0 971 536 B1 | 9/2001 |
| EP | 0 755 161 B1 | 10/2001 |
| EP | 1 178 691 A1 | 6/2002 |
| EP | 1326451 | 7/2003 |
| GB | 1586431 | 3/1981 |
| JP | 09-102940 | 4/1997 |
| JP | 11-252518 | 9/1999 |
| JP | 2000-324395 | 11/2000 |
| JP | 2002-290895 | 10/2002 |
| JP | 2003-061098 | 2/2003 |
| JP | 2003-224826 | 8/2003 |
| JP | 2003-230136 | 8/2003 |
| KR | 10-2001-0001725 | 1/2001 |
| KR | 10-2002-0043812 | 6/2002 |
| KR | 10-2003-0030554 | 4/2003 |
| TW | 578068 | 3/2004 |
| TW | 200407812 | 5/2004 |
| WO | WO 03/105152 A1 | 12/2003 |
| WO | WO 2005-034122 | 4/2005 |
| WO | WO 2005/034122 A1 | 4/2005 |
| WO | WO 2005/045833 A1 | 5/2005 |
| WO | WO 2005/079171 A2 | 9/2005 |
| WO | WO 2005/083708 A1 | 9/2005 |

OTHER PUBLICATIONS

Office Action issued Dec. 13, 2007 by the European Patent Office in counterpart European Application No. 04 800 131.7-2223.
Office Action issued Sep. 4, 2007 by the European Patent Office in counterpart European Application No. 05 704 438.0-2223.
International Search Report issued Aug. 8, 2007 in counterpart International Patent Application No. PCT/KR2004/002935.
Office Action issued Dec. 17, 2007 by the European Patent Office in counterpart European Patent Application No. 04 800 130.9-2223.
International Search Report issued Jul. 22, 2005 in corresponding International Patent Application No. PCT/KR2005/000091.
Understanding SAMI 1.0, *Microsoft Corp*. XP007902747 (pub. Oct. 2001, updated Feb. 2003).
Jakob Nielsen, "Effective Use of Style Sheets", Alertbox, Jul. 1 1997.
Office Action issued Jul. 25, 2008 by the U.S. Patent and Trademark Office in counterpart U.S. Appl. No. 10/911,731.
Office Action issued Jun. 6, 2008 by the Chinese Patent Office in counterpart Chinese Patent Application No. 200480041530.5 (with English language translation).
Office Action issued May 1, 2008 by the U.S. Patent and Trademark Office in counterpart U.S. Appl. No. 11/033,494.
Office Action issued Dec. 10, 2007 by the U.S. Patent and Trademark Office in counterpart U.S. Appl. No. 10/986,998.
Office Action issued Apr. 5, 2007 by the U.S. Patent and Trademark Office in counterpart U.S. Appl. No. 11/022,759.
Office Action issued Jan. 23, 2009 by the Russian Patent Office in counterpart Russian Patent Application No. 2006132342/28 (English language translation thereof).
Office Action issued Jan. 23, 2009 by the Russian Patent Office in counterpart Russian Patent Application No. 2006128572/28 (English language translation thereof).
Office Action issued Sep. 26, 2008 by the Chinese Patent Office in counterpart Chinese Patent Application No. 200480039874.2.
Office Action issued Nov. 14, 2008 by the Malaysian Patent Office in counterpart Malaysian Patent Application No. PI 20050164.
Office Action issued Dec. 11, 2008 by the U.S. Patent and Trademark Office in U.S. Appl. No. 11/022,759.
Office Action issued Mar. 19, 2009 by the USPTO in counterpart U.S. Appl. No. 10/957,572.
Office Action issued Jun. 16, 2008 by the Taiwan Intellectual Property Office in counterpart Taiwanese Patent Application No. 093132463 and English language translation of same.

* cited by examiner

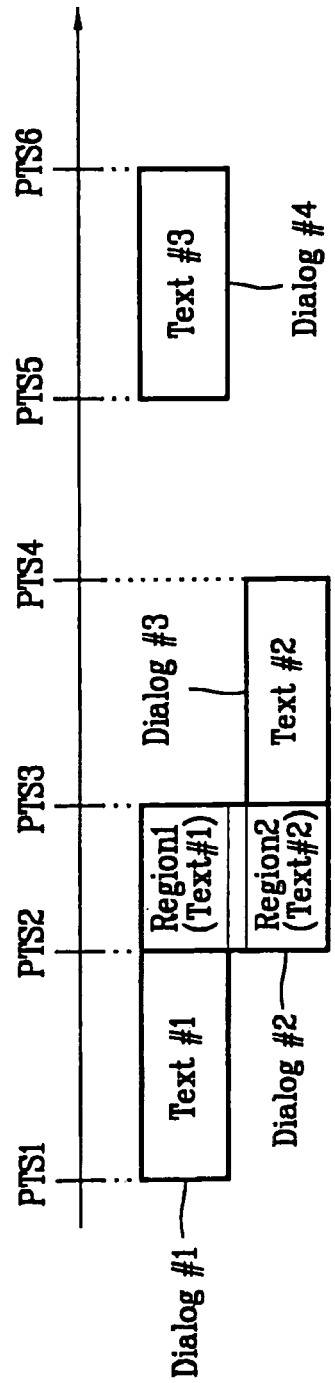

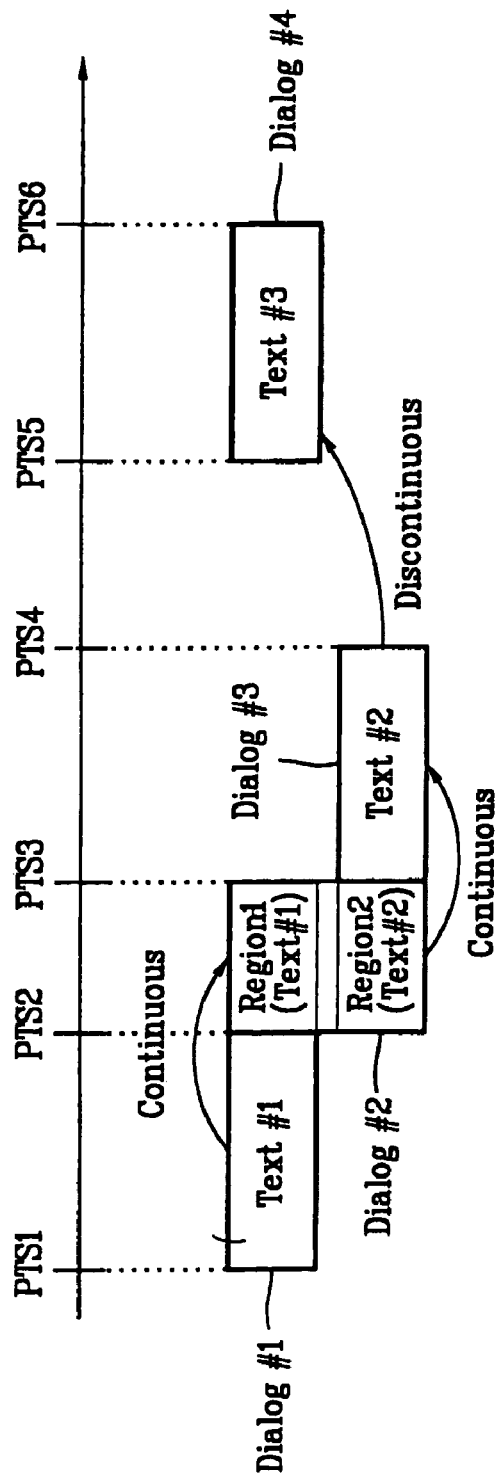

FIG. 8

```
Text_subtitle_stream () {
    dialog_style_unit()
    while (processed_length < end_of_file){
        dialog_presentation_unit()
    }
}
```

FIG. 9A

```
dialog_style_unit () {
    unit_type
    reserved
    unit_length
    dialog_styleset()
}
```

FIG. 9B

```
dialog_styleset () {
      player_style_flag
      reserved
      number_of_region_styles
      for (region_style_id=0;
      region_style_id<number_of_region_styles; region_style_id++) {
            region_style() {
                  region_info() {
                              region_horizontal_position
                              region_vertical_position
                              region_width
                              region_height
                              region_bg_color_index
                  }
                  text_horizontal_position
                  text_vertical_position
                  text_flow
                  text_alignment
                  line_space
                  font_id
                  font_style
                  font_size
                  font_color_index
            }
            user_changeable_styleset()
      }
```

FIG. 9C

```
user_changeable_styleset() {
      number_of_user_styles
      for(user_style_id=0;
      user_style_id<number_of_user_styles;
      user_style_id++){
                User_control_style() {
                region_horizontal_position_direction
                region_horizontal_position_delta
                region_vertical_position_direction
                region_vertical_position_delta
                font_size_inc_dec
                font_size_delta
                }
         }
```

RECORDING MEDIUM AND METHOD AND APPARATUS FOR DECODING TEXT SUBTITLE STREAMS

DOMESTIC PRIORITY INFORMATION

This application claims the benefit of priority under 35 U.S C. §119 on U.S. Provisional Patent Application 60/542,852, filed Feb. 10, 2004; U.S. Provisional Patent Application 60/542,850, filed Feb. 10, 2004; U.S. Provisional Patent Application 60/543,328, filed Feb. 11, 2004; and U.S. Provisional Patent Application 60/544,234, filed Feb. 13, 2004.

FOREIGN PRIORITY INFORMATION

This application claims the benefit of Korean Patent Application No. 10-2004-0017935, filed on Mar. 17, 2004, which is hereby incorporated by reference.

BACKGROUND OF THE INVENTION

1. Field of the Invention

The present invention relates to a recording medium and a method and apparatus for decoding a text subtitle stream recorded on a recording medium.

2. Discussion of the Related Art

Optical discs are widely used as an optical recording medium for recording mass data. Presently, among a wide range of optical discs, a new high-density digital video disc (hereinafter referred to as "HD-DVD"), such as a Blu-ray Disc (hereafter referred to as "BD"), is under development for recording high definition video and audio data. Currently, global standard technical specifications of BDs, which are known to be the next generation HD-DVD technology, are under establishment as a next generation optical recording solution that is able to have data significantly surpassing the conventional DVD, along with many other digital apparatuses.

Accordingly, optical reproducing apparatuses having the Blu-ray Disc (BD) standards applied thereto are also being developed. However, since the Blu-ray Disc (BD) standards are yet to be completed, there have been many difficulties in developing a complete optical reproducing apparatus. Particularly, in order to effectively reproduce the data from the Blu-ray Disc (BD), not only should the main AV data as well as various data required for a user's convenience, such as subtitle information as the supplementary data related to the main AV data, be provided, but also managing information for reproducing the main data and the subtitle data recorded in the optical disc should be systemized and provided.

However, in the present Blu-ray Disc (BD) standards, since the standards of the supplementary data, particularly the subtitle information, are not completely consolidated, there are many restrictions in the full-scale development of a Blu-ray Disc (BD) based optical reproducing apparatus. And, such restrictions cause problems in providing the supplementary data such as subtitles to the user.

SUMMARY OF THE INVENTION

Accordingly, the present invention is directed to a text subtitle decoder and a method for decoding text subtitle streams recorded on a recording medium that substantially obviates one or more problems due to limitations and disadvantages of the related art.

An object of the present invention is to provide a recording medium including a dialog style segment, which includes a player style flag for indicating whether a player is permitted to generate its own set of player styles.

Another object of the present invention is to a method and an apparatus for decoding a text subtitle stream, in which a text subtitle decoder reads a player style flag included in a dialog style segment to determine whether a player is permitted to generate its own set of player styles.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium includes a data area storing at least one text subtitle stream. Each text subtitle stream stored in the data area includes a dialog style segment defining a set of styles and at least one dialog presentation segment. Each dialog presentation segment contains at least one region of dialog text and is linked to at least one of the set of styles. The dialog style segment includes a player style flag indicating whether a player is permitted to generate its own set of player styles. The set of styles defined in the dialog style segment may be a set of user-defined region styles.

In another aspect of the present invention, a method and an apparatus for decoding a text subtitle stream recorded on a recording medium are provided. A subtitle loading buffer loads the text subtitle stream from the recording medium. The loaded text subtitle stream includes a dialog style segment defining a set of styles and at least one dialog presentation segment, each of which contains at least one region of dialog text and is linked to at least one of the set of styles. Next, a text subtitle decoder reads a player style flag included in the dialog style segment to determine whether a player is permitted to generate its own set of player styles. If the permission is indicated by the player style flag, the text subtitle decode is now able to use the set of player styles when decoding each dialog presentation segment.

In a first example, each player style may represent a region style specifying an independent set of region presentation properties for a region of dialog text. In another example, each player style may be configured to redefine at least one of region presentation properties defined by the linked region style. In a further example, each player style may be configured to change at least one of region presentation properties specified by the linked style. It may specify a direction and a magnitude of a change in at least one of the region presentation properties.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 6A illustrates presentations of text subtitle dialogs on a display screen in presentation time stamp (PTS) intervals;

FIG. 6B illustrates a table including timing information, style information and dialog data;

FIG. 6C illustrates continuities between text subtitle dialogs presented on a display screen in PTS intervals;

FIG. 6D illustrates a table including timing information, style information and dialog data;

FIG. 8 illustrates a syntax for a text subtitle stream according to an example of the present invention;

FIG. 9A illustrates a syntax for a dialog style unit according to an example of the present invention;

FIG. 9B illustrates a syntax for a dialog style set included in a dialog style unit according to an example of the present invention;

FIG. 9C illustrates a syntax for a user changeable style set included in a dialog style set according to an example of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In this detailed description, main data represent audio/video (AV) data that belong to a title (e.g., a movie title) recorded in an optical disc by an author. In general, the AV data are recorded in MPEG2 format and are often referred to as AV streams or main AV streams. In addition, supplementary data represent all other data required for reproducing the main data, examples of which are text subtitle streams, interactive graphic streams, presentation graphic streams, and supplementary audio streams (e.g., for a browsable slideshow). These supplementary data streams may be recorded in MPEG2 format or in any other data format. They could be multiplexed with the AV streams or could exist as independent data files within the optical disc.

A subtitle represents caption information corresponding to video (image) data being reproduced, and it may be represented in a predetermined language. For example, when a user selects an option for viewing one of a plurality of subtitles represented in various languages while viewing images on a display screen, the caption information corresponding to the selected subtitle is displayed on a predetermined portion of the display screen. If the displayed caption information is text data (e.g., characters), the selected subtitle is often called a text subtitle. According to one aspect of the present invention, a plurality of text subtitle streams in MPEG2 format may be recorded in an optical disc, and they may exist as a plurality of independent stream files. Each text subtitle stream file includes text data for a text subtitle and reproduction control data required for reproduction of the text data. According to another aspect of the present invention, only a single text subtitle stream in MPEG2 format may be recorded in an optical disc.

Figure 1:
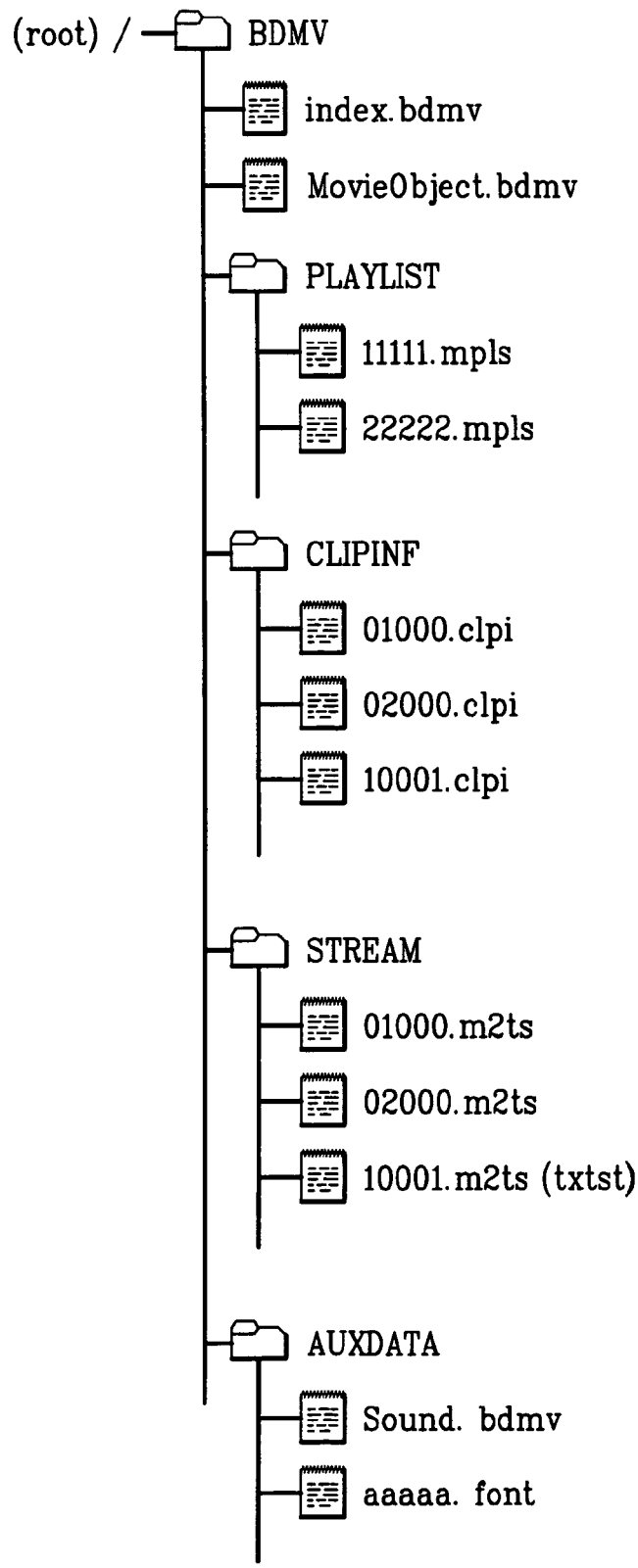
FIG. 1 illustrates a file structure of data files recorded on an optical disc according to an example of the present invention.

FIG. 1 illustrates a file structure of data files recorded on an optical disc, an example of which is a Blu-ray disc (hereinafter "BD"), according to the present invention. Referring to FIG. 1, at least one BD directory (BDMV) is included in a root directory (root). Each BD directory includes an index file (index.bdmv) and an object file (MovieObject.bdmv), which are used for interacting with one or more users. For example, the index file may contain data representing an index table having a plurality of selectable menus and movie titles. Each BD directory further includes four file directories that include audio/video (AV) data to be reproduced and various data required for reproduction of the AV data.

The file directories included in each BD directory are a stream directory (STREAM), a clip information directory (CLIPINF), a playlist directory (PLAYLIST), and an auxiliary data directory (AUX DATA). First of all, the stream directory (STREAM) includes audio/video (AV) stream files having a particular data format. For example, the AV stream files may be in the form of MPEG2 transport packets and be named as "*.m2ts", as shown in FIG. 1. The stream directory may further include one or more text subtitle stream files, where each text subtitle stream file includes text (e.g., characters) data for a text subtitle represented in a particular language and reproduction control information of the text data. The text subtitle stream files exist as independent stream files within the stream directory and may be named as "*.m2ts" or "*.txtst", as shown in FIG. 1. An AV stream file or text subtitle stream file included in the stream directory is often called a clip stream file.

Next, the clip information directory (CLIPINF) includes clip information files that correspond to the stream files (AV or text subtitle) included in the stream directory, respectively. Each clip information file contains property and reproduction timing information of a corresponding stream file. For example, A clip information file may includes mapping information, in which presentation time stamps (PTS) and source packet numbers (SPN) are one-to-one mapped by an entry point map (EPM). Using the mapping information, a particular location of a stream file may be determined from timing information (In-Time and Out-Time) provided by a PlayItem or SubPlayItem, which will be discussed later in more details. In the industry standard, each pair of a stream file and its corresponding clip information file is designated as a clip. For example, 01000.clpi included in CLIPINF includes property and reproduction timing information of 01000.m2ts included in STREAM, and 01000.clpi and 01000.m2ts form a clip.

Referring back to FIG. 1, the playlist directory (PLAYLIST) includes one or more PlayList files (*.mpls), where each PlayList file includes at least one PlayItem which designates at least one main AV clip and the reproduction time of the main AV clip. More specifically, a PlayItem contains information designating In-Time and Out-Time, which represent reproduction begin and end times for a main AV clip designated by Clip_Information_File_Name within the PlayItem. Therefore, a PlayList file represents the basic reproduction control information for one or more main AV clips. In addition, the PlayList file may further include a SubPlayItem, which represents the basic reproduction control information for a text subtitle stream file. When a SubPlayItem is included in a PlayList file to reproduce one or more text subtitle stream files, the SubPlayItem is synchronized with the PlayItem(s). On the other hand, when the SubPlayItem is used to reproduce a browsable slideshow, it may not be synchronized with the PlayItem(s). According to the present invention, the main function of a SubPlayItem is to control reproduction of one or more text subtitle stream files.

Lastly, the auxiliary data directory (AUX DATA) may include supplementary data stream files, examples of which are font files (e.g., *.font or *.otf), pop-up menu files (not illustrated), and sound files (e.g., Sound.bdmv) for generating click sound. The text subtitle stream files mentioned earlier may be included in the auxiliary data directory instead of the stream directory.

Figure 2:
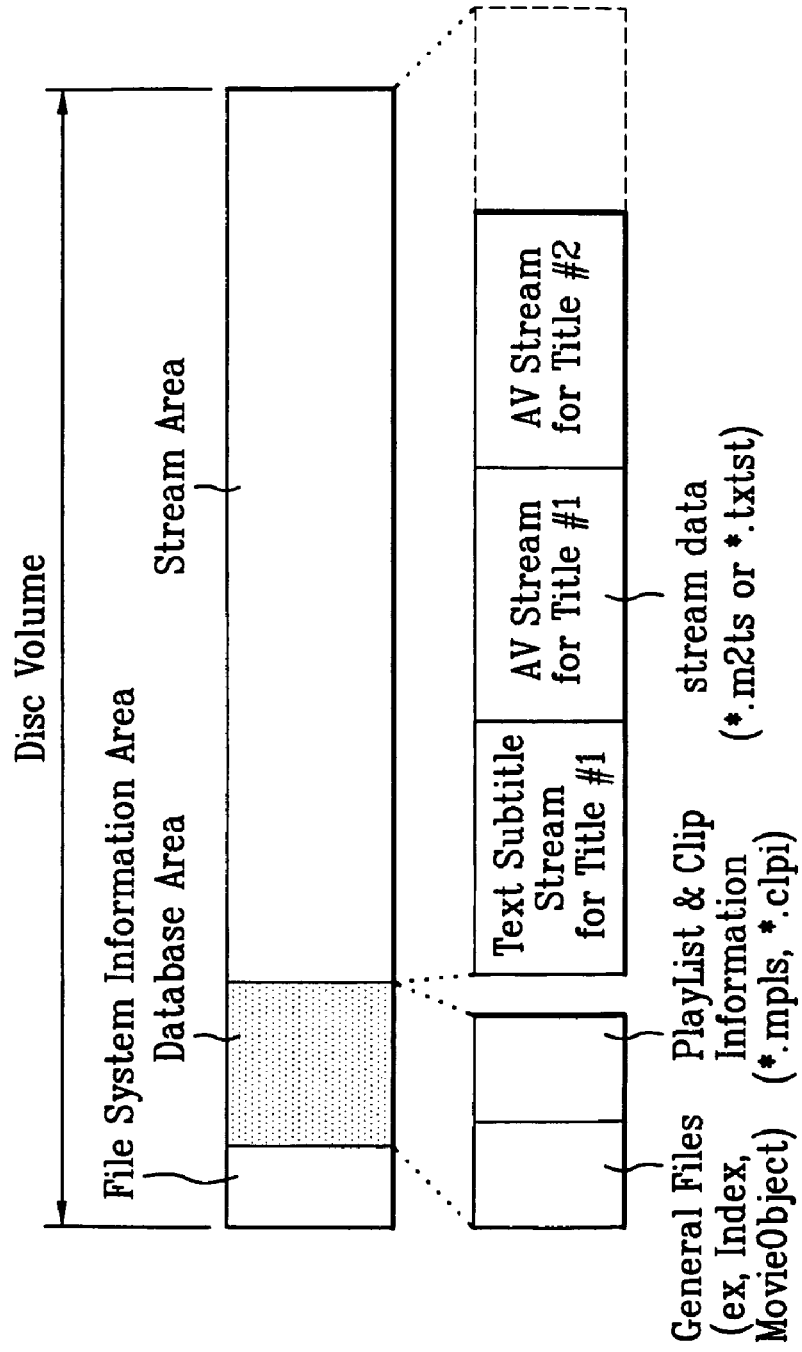
FIG. 2 illustrates data storage areas of an optical disc according to an example of the present invention.

FIG. 2 illustrates data storage areas of an optical disc according to the present invention. Referring to FIG. 2, the optical disc includes a file system information area occupying the inmost portion of the disc volume, a stream area occupying the outmost portion of the disc volume, and a database area occupied between the file system information area and the stream area. In the file system information area, system information for managing the entire data files shown in FIG. 1 is stored. Next, AV streams and one or more text subtitle streams are stored in the stream area. The general files, PlayList files, and clip information files shown in FIG. 1 are stored in the database area of the disc volume. As discussed above, the general files include an index file and an object file, and the PlayList files and clip information files include information required to reproduce the AV streams and the text subtitle streams stored in the stream area. Using the information stroed in the database area and/or stream area, a user is able to select a specific playback mode and to reproduce the main AV and text subtitle streams in the selected playback mode.

Figure 3:
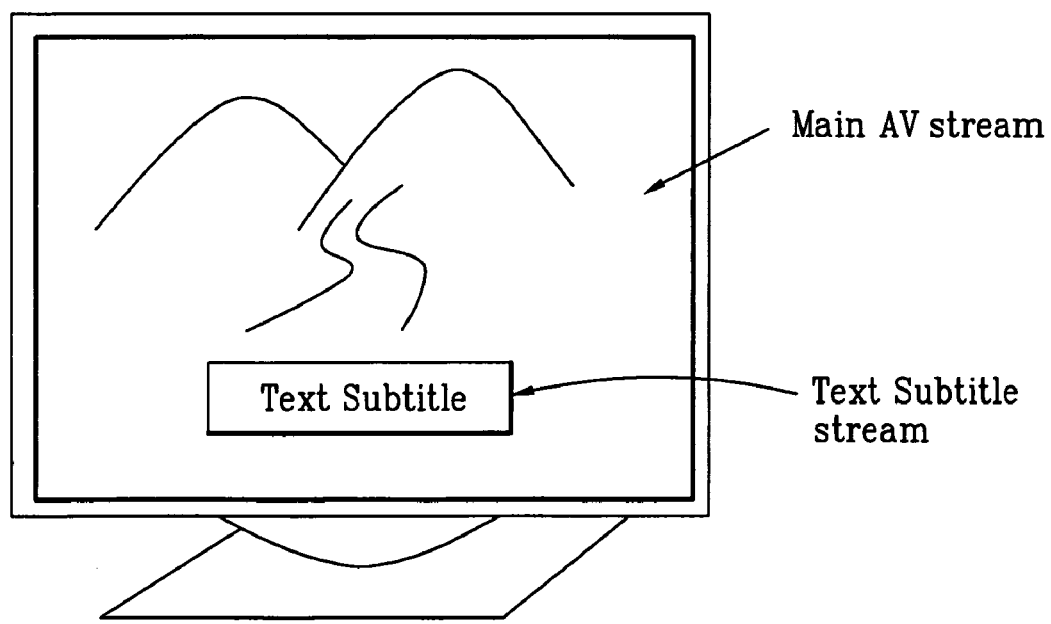
FIG. 3 illustrates a text subtitle and a main image presented on a display screen when a text subtitle stream and a main AV stream are reproduced.

FIG. 3 illustrates a text subtitle and a main image presented on a display screen when a text subtitle stream and a main AV stream are reproduced. The main image and the text subtitle are simultaneously displayed on the display screen when a main AV stream and a corresponding text subtitle stream are reproduced in synchronization.

Figure 4:
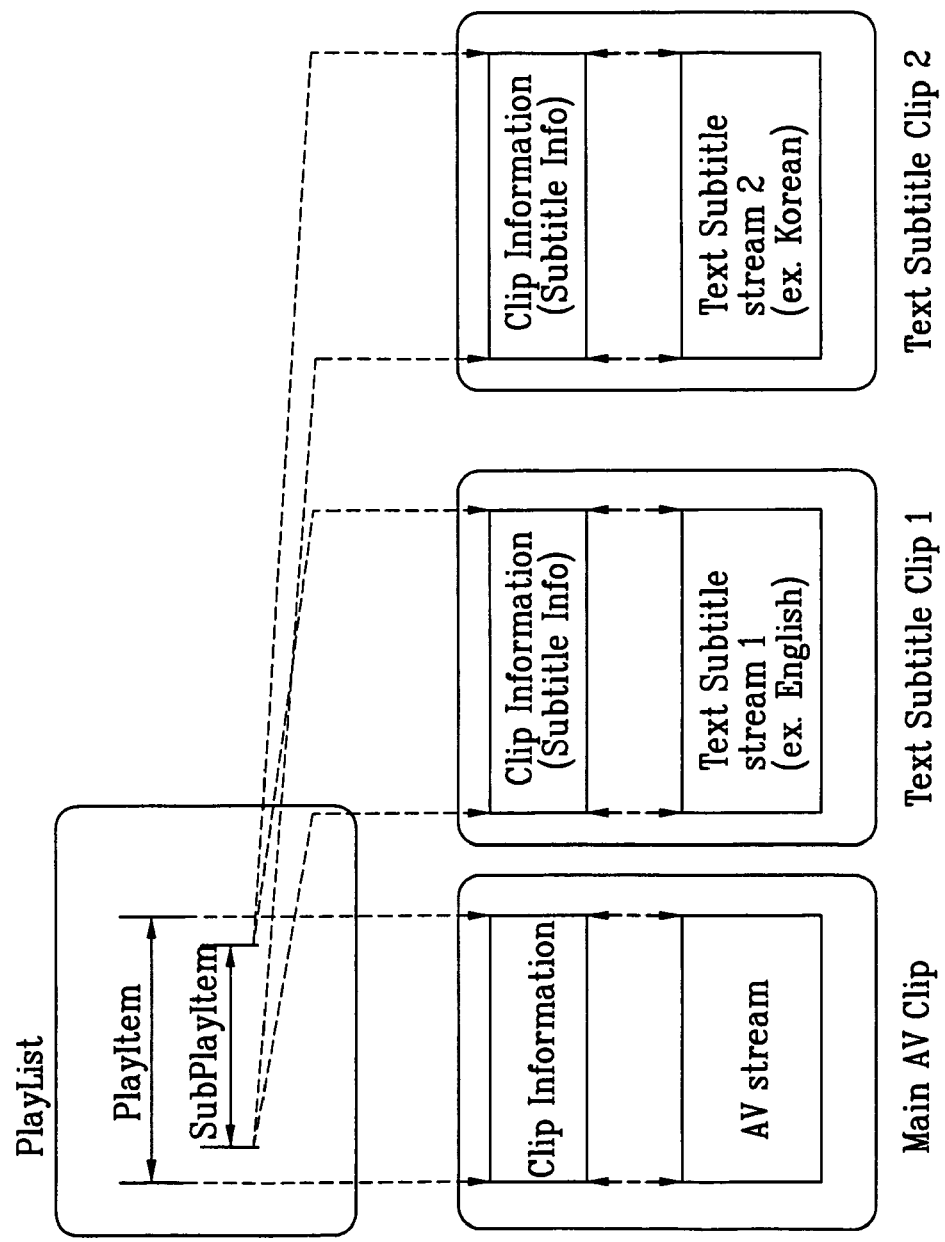
FIG. 4 is a schematic diagram illustrating reproduction control of a main AV clip and text subtitle clips by a PlayList.

FIG. 4 is a schematic diagram illustrating reproduction control of a main AV clip and text subtitle clips by a PlayList. Referring to FIG. 4, a PlayList file includes at least one PlayItem controlling reproduction of at least one main AV clip and a SubPlayItem controlling reproduction of a plurality of text subtitle clips. One of text subtitle clip 1 and text subtitle clip 2 shown in FIG. 4 for English and Korean text subtitles may be synchronized with the main AV clip such that a main image and a corresponding text subtitle are displayed on a display screen simultaneously at a particular presentation time. In order to display the text subtitle on the display screen, display control information (e.g., position and size information) and presentation time information, examples of which are illustrated in FIG. 5A to FIG. 5C, are required.

Figure 5A:
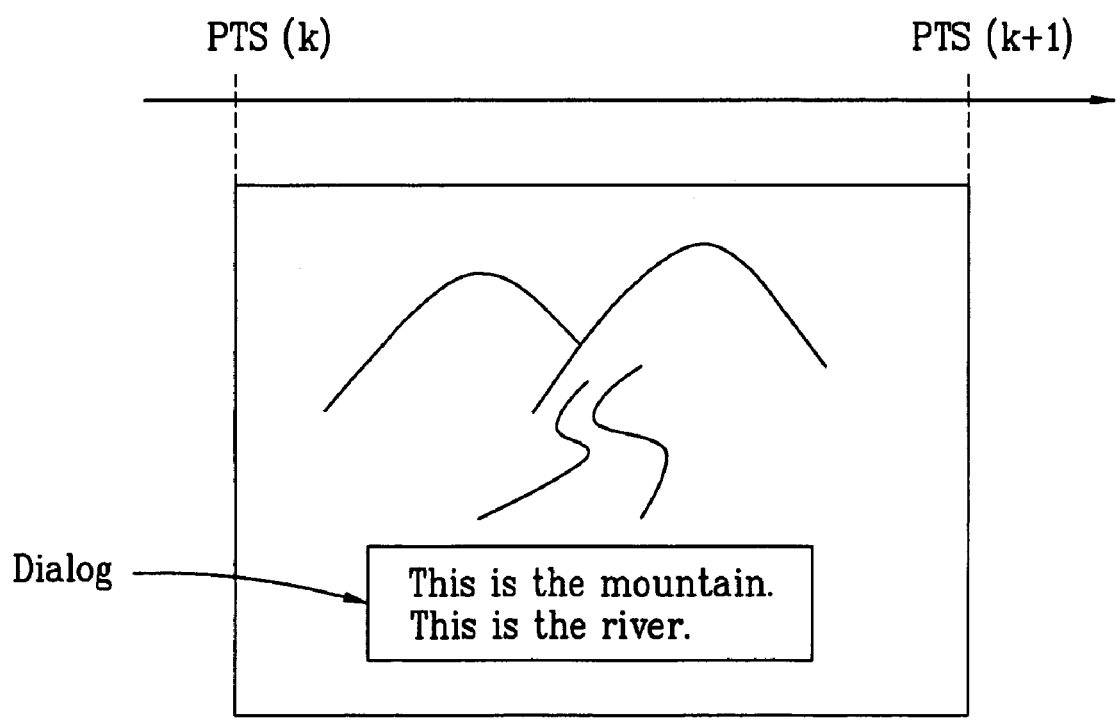
FIG. 5A illustrates a dialog presented on a display screen according to an example of the present invention.

FIG. 5A illustrates a dialog presented on a display screen according to the present invention. A dialog represents entire text subtitle data displayed on a display screen during a given presentation time. In general, presentation times of the dialog may be represented in presentation time stamps (PTS). For example, presentation of the dialog shown in FIG. 5A starts at PTS (k) and ends at PTS (k+1). Therefore, the dialog shown in FIG. 5A represents an entire unit of text subtitle data which are displayed on the display screen between PTS (k) and PTS (k+1). A dialog includes at least one line of subtitle text (characters). When there are two or more lines of subtitle text in a dialog, entire text data may be displayed according to a style defined for the dialog. The maximum number of the characters included in a dialog may be limited to about 100.

Figure 5B:
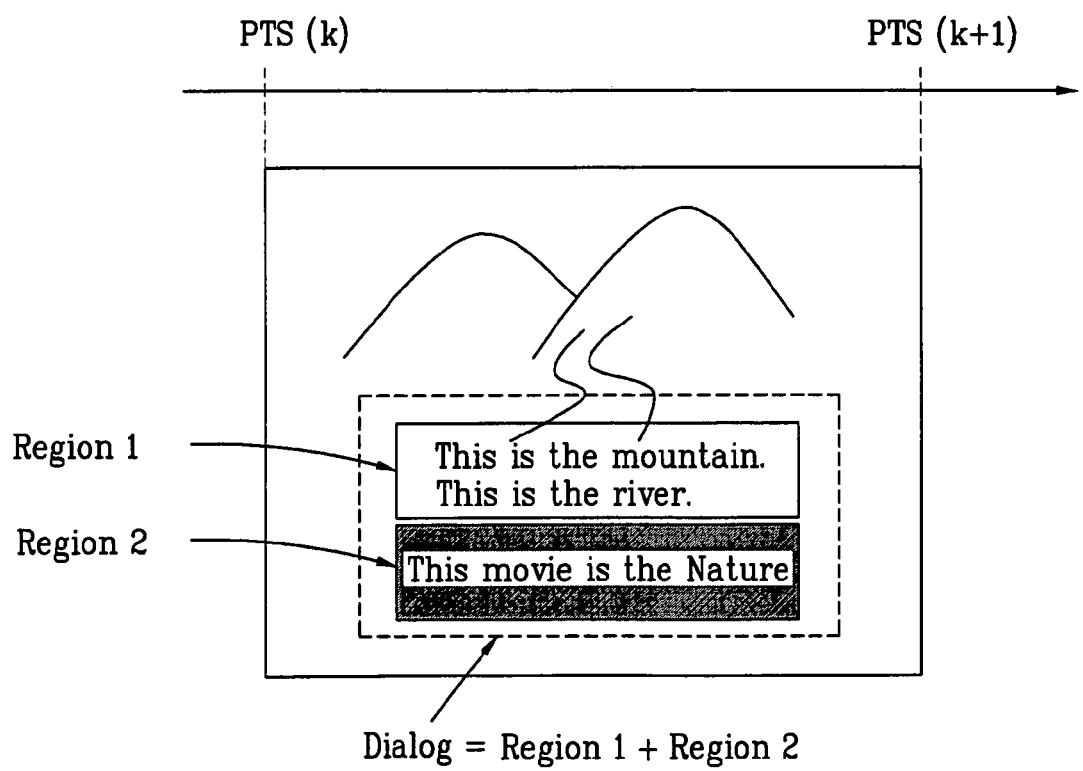
FIG. 5B illustrates regions of a dialog according to an example of the present invention.

In addition, FIG. 5B illustrates regions of a dialog according to the present invention. A region represents a divided portion of text subtitle data (dialog) displayed on a display screen during a given presentation time. In other words, a dialog includes at least one region, and each region may include at least one line of subtitle text. The entire text subtitle data representing a region may be displayed on the display screen according to a region style (global style) assigned to the region. The maximum number of regions included in a dialog should be determined based on a desired decoding rate of the subtitle data because the greater number of regions generally results a lower decoding ratio. For example, the maximum number of regions for a dialog may be limited to two in order to achieve a reasonably high decoding rate. However, the maximum number could be greater than two for other purposes.

Figure 5C:
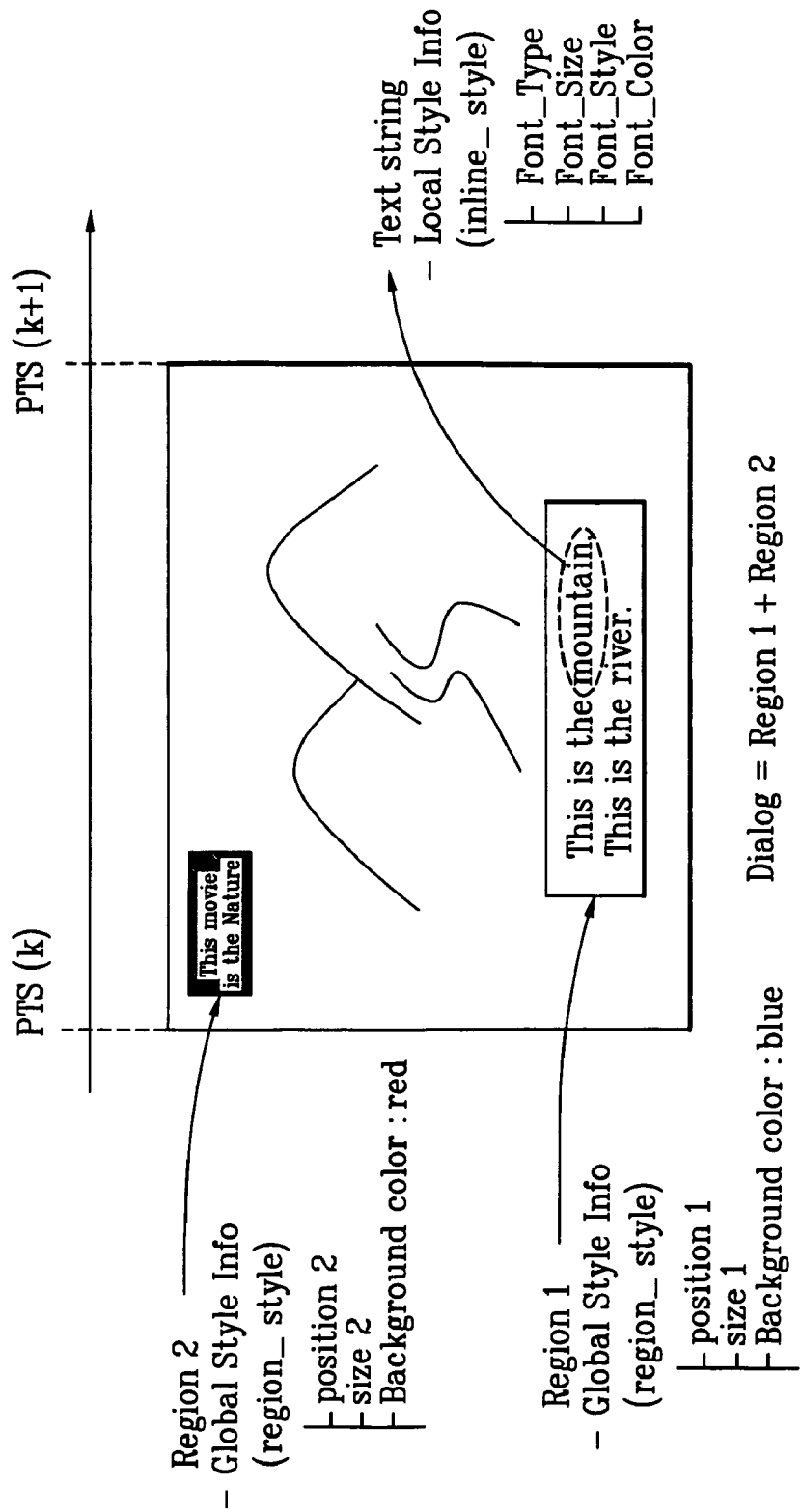
FIG. 5C illustrates region and inline styles for regions of a dialog according to an example of the present invention.

FIG. 5C illustrates style information for regions of a dialog according to the present invention. Style information represents information defining properties required for displaying at least a portion of a region included in a dialog. Some of the examples of the style information are position, region size, background color, text alignment, text flow information, and many others. The style information may be classified into region style information (global style information) and inline style information (local style information).

Region style information defines a region style (global style) which is applied to an entire region of a dialog. For example, the region style information may contain at least one of a region position, region size, font color, background color, text flow, text alignment, line space, font name, font style, and font size of the region. For example, two different region styles are applied to region 1 and region 2, as shown in FIG. 5C. A region style with position 1, size 1, and blue background color is applied to Region 1, and a different region style with position 2, size 2, and red background color is applied to Region 2.

On the other hand, inline style information defines an inline style (local style) which is applied to a particular portion of text strings included in a region. For example, the inline style information may contain at least one of a font type, font size, font style, and font color. The particular portion of text strings may be an entire text line within a region or a particular portion of the text line. Referring to FIG. 5C, a particular inline style is applied to the text portion "mountain" included in Region 1. In other words, at least one of the font type, font size, font style, and font color of the particular portion of text strings is different from the remaining portion of the text strings within Region 1.

FIG. 6A illustrates presentations of text subtitle dialogs on a display screen in presentation time stamp (PTS) intervals. There are four dialogs to be displayed between PTS1 to PTS6. More specifically, Dialog #1 has only one region and Text #1 is displayed within this region between PTS1 to PTS2. Next, Dialog #2 has Region 1 and Region 2 and Text #1 and Text #2 are displayed within Region 1 and Region 2, respectively, between PTS2 to PTS3. Thereafter, Dialog #3 also has only one region and Text #2 is displayed within this region between PTS3 and PTS4. There is no dialog to be presented between PTS4 to PTS5, and Text #3 is displayed within a region of Dialog #4 between PTS5 to PTS6. Information defining a dialog includes dialog presentation time information and dialog text data including style information and text strings to be displayed within each region of the dialog as shown in FIG. 6B. An example of the presentation time information(timing (PTS set) column of FIG. 6B) is a set of start PTS start and PTS end, and the style information (Style info column of FIG. 6B) includes region (global) style information and inline (local) style information described above. It is shown in FIG. 6B that different style information sets may be applied to the dialogs.

FIGs. 6C and 6D illustrate continuities between text subtitle dialogs being presented on a display screen in PTS intervals. Referring to FIGs. 6C, and 6D, the presentation end time of Dialog #1 is identical to the presentation start time of Dialog #2. Therefore, a continuity exists between Dialog #1 and Dialog #2. Display of Text #1 in a region of Dialog #1 is continuous with display of Text #1 in Region 1 of Dialog #2. In other words, PTS intervals of both dialogs are continuous and same style information (region and inline) is used when presenting Text #1 in both regions. Similarly, another continuity exists between Dialog #2 and Dialog #3 because display of Text #2 in Region 2 of Dialog #2 is continuous with display of Text #2 in a region of Dialog #3. In order to ensure a continuity between two consecutive dialogs displaying same subtitle text, presentation times (PTS intervals) of the dialogs must be continuous. In addition, same region and inline style information must be used when presenting the same text in the regions, respectively. Referring back to FIGs. 6A and 6B, there is no continuity between Dialog #3 and Dialog #4 because their PTS intervals are not continuous. An indicator (e.g., continuous_presentation_flag) may be included in presentation information of a current dialog to indicate whether the dialog is continuous with a previous dialog.

Figure 7A:
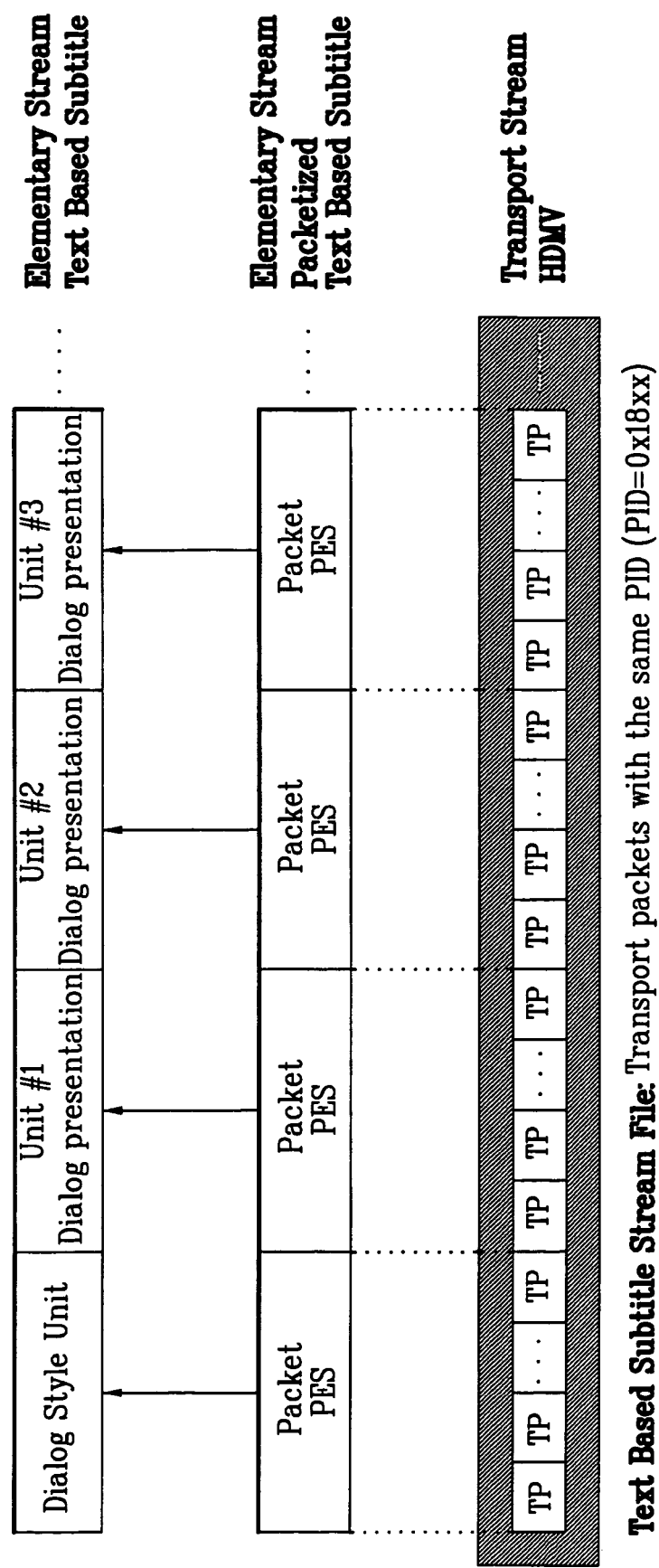
FIG. 7A illustrates a text subtitle stream file according to an example of the present invention.

FIG. 7A illustrates a text subtitle stream file (e.g., 10001.m2ts shown in FIG. 1) according to the present invention. It may be formed of an MPEG2 transport stream including a plurality of transport packets (TP), all of which have a same packet identifier (e.g., PID=0x18xx). When a disc player receives many input streams including a particular text subtitle stream, it finds all the transport packets that belong to the text subtitle stream using their PIDs. Referring to FIG. 7A, each sub-set of transport packets form a packet elementary stream (PES) packet. One of the PES packets shown in FIG. 7A corresponds to a dialog style unit (DSU) defining a group of region styles. A DSU is also often referred as a dialog style segment (DSS). All the remaining PES packets correspond to dialog presentation units (DPUs), each of which includes presentation information for a dialog having at least one region, and dialog text data including a region style indicator, inline style information, and text strings for each region. Similarly, a DPU sis also often referred as a dialog presentation segment (DPS).

Figure 7B:
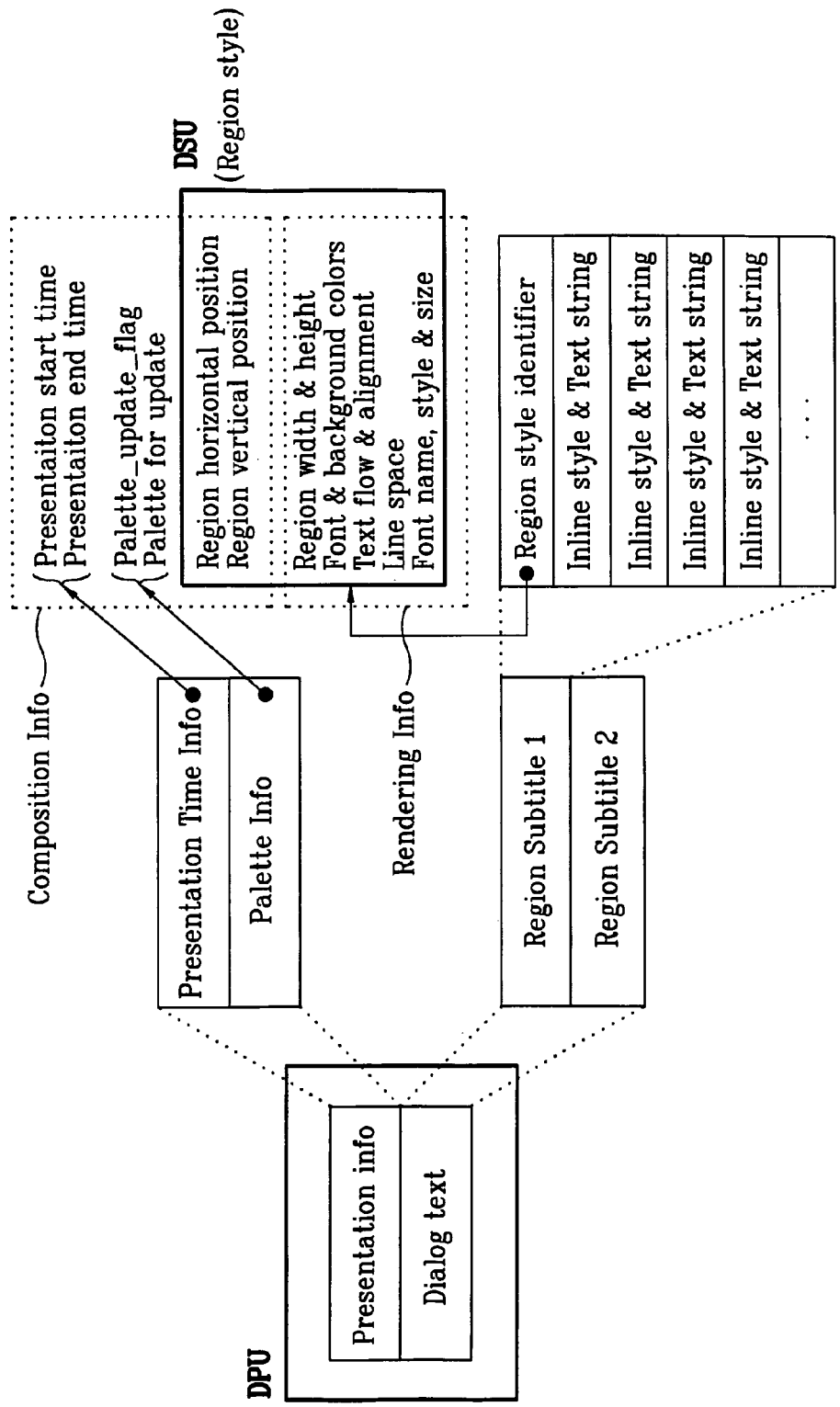
FIG. 7B illustrates specific information contained within a DPU and a DSU included in a text subtitle stream according to an example of the present invention.

FIG. 7B illustrates specific information contained within a DPU and a DSU included in a text subtitle stream according to the present invention. A DSU contains information sets defining a group of region styles, each of which is applied to a corresponding region of a dialog. In addition, a DPU contains dialog text data and dialog presentation information for a dialog. The dialog text data includes text strings to be included in each region of the dialog, inline style information to be applied to a particular portion of the text strings, and a region style identifier indicating a region style to be applied to each dialog region. The region style identifier identifies one of the group of region styles defined in the DSU. On the other hand, the dialog presentation information includes presentation time information and palette (color) update information for a dialog. The presentation time information may include presentation start time (e.g, PTS_start) and presentation end time (e.g., PTS_end) for presenting the dialog on a display screen, and the palette update information may include an indicator (e.g., palette_update_flag) indicating whether to update display colors of the dialog and palette information (e.g., Palette for update) to be applied when updating the display colors.

All the data included in a text subtitle stream may be classified into three types of data based on their basic functions. For example, the data could be classified into dialog text data, composition information, and rendering information, as shown in FIG. 7B. The dialog text data include text string(s), inline style information, and a region style identifier for each region of a dialog. The composition information includes presentation time information, examples of which are presentation start and end times, position information for a dialog region, and palette update information for a dialog. Lastly, the rendering information includes information required for rendering the text strings to graphic data for presentation. Referring to FIG. 7B, the horizontal and vertical positions of each region included in the DSU is a part of the composition information, and the region width, region height, font color, background color, text flow, text alignment, line space, font name, font style, and font size included in the DSU represent the rendering information.

A DSU includes a set of region style information (dialog style set) defining a limited number of author-defined region styles, respectively. For example, the maximum number of the region styles defined in a DSU may be limited to 60, and the region styles may be identified by their region style identifications (region_style_id). Therefore, an author stores a DSU defining only a limited number of region styles in an optical disc. The region styles are used by a disc player when reproducing text subtitle streams recorded on the optical disc. Alternatively, the disc player may use other region styles defined by an additional set of style information, which may be provided from other source. An example of the source is a local data storage included in the disc player. As a result, the subtitle regions reproduced from the text subtitle streams recorded on the optical disc can have a variety of region styles.

FIG. 8 illustrates a syntax for a text subtitle stream (Text_subtitle_stream ( )) according to an example of the present invention. As mentioned earlier, the text subtitle stream syntax includes a syntax for a dialog style unit (dialog_style_unit ( )) including a set of information defining a set of region styles, respectively, and syntaxes for a plurality of dialog presentation units (dialog_presentation_unit ( )), where each DPU syntax includes dialog presentation information and at least one region of dialog text. Each region of dialog text includes a region style identifier, one or more text strings, and inline style information, and the region style identifier identifies one of the set of region styles defined in the DSU syntax.

FIG. 9A illustrates the syntax for a dialog style unit (dialog_style_unit ( )) included in the text subtitle stream syntax shown in FIG. 8. The dialog style unit syntax includes a syntax for a dialog style set (dialog_styleset ( )) in which a set of author-defined region styles are defined. FIG. 9B illustrates the syntax for a dialog style set (dialog_styleset ( )) included in the dialog style unit syntax shown in FIG. 9A. The dialog style set syntax includes a set of region style information defining a set of region styles (region_style ( )), respectively, and a data field or a flag (player_style_flag) indicating whether the author permitted a player to generate its own set of styles (player styles) for a text subtitle in addition to the set of author-defined style defined in region_style ( ). The dialog style set syntax further includes a syntax for a user-changeable style set (user_changeable_styleset ( )) defining a set of user control styles.

Referring to FIG. 9B, region style identifications (region_style_id) are assigned to the set of region styles (region_style ( )), respectively, and each region style information represents global style information to be applied to an entire portion of a region of dialog text. The region style identifier included in a DPU for each region includes one of the region style identifications. Therefore, a region style corresponding to the region style identifier is applied when reproducing at least one region of dialog text contained in each DPU.

Reference will now be made in detail to specific region presentation properties defined in each region style (region_style ( )). A region horizontal position (region_horizontal_position) specifies the horizontal address of the top left pixel of a region in a graphics plane, and a region vertical position (region_vertical_position) specifies the vertical address of the top left pixel of the region in the graphics plane. In addition, a region width (region_width) specifies the horizontal length of the region rectangle from the region horizontal position, and a region height (region_height) specifies the vertical length of the region rectangle from the region vertical position. A region background color index (region_bg_color_index) specifies an index value indicating the background color of the region.

In addition, a text horizontal position (text_horizontal_position) specifies the horizontal address of an origin of text in the region, and a text vertical position (text_vertical_position) specifies the vertical address of the text origin in the region. A text flow (text_flow) specifies at least one of character progression (left-to-right or right-to-left) and line progression (top-to-bottom or bottom-to-top) in the region. A text alignment (text_alignment) specifies alignment (left, center, or right) of rendered text in the region. When a dialog has more than one regions, the same text flow must be applied to all the regions in order to prevent the viewers' confusion. Referring back to FIG. 9B, a line space (line_space) specifies the distance between two adjacent lines of text in the region. A font identification (font_id) indicates the font identification specified in a clip information file. A font style (font_style) specifies the style of font for the text in the region, examples of which are normal, bold, italic, and bold and italic. A font size (font_size) specifies the size of font for the text in the region, an example of which is the vertical size of a character in unit of pixels. Lastly, a font color index (font_color_index) specifies an index value indicating the color of the text in the region.

The player style flag (player_style_flag) shown in FIG. 9B indicates whether an author permitted a disc player to generate and/or use its own set of styles (player styles), which may be pre-stored in a local data storage of the disc player, for a text subtitle in addition to the author-defined region styles defined in an optical disc. For example, if the value of the player style flag is set to 1b, the author permits the player to generate and/or use its own set of player styles. On the other hand, if the value of the player style flag is set to 0b, the author prohibits the player from generating and/or using the set of player styles.

FIG. 9C illustrates a syntax for a user changeable style set (user_changeable_styleset ( )) included in the dialog style set syntax shown in FIG. 9B. user_changeable_styleset ( ) includes a set of user control style information defining a set of user control styles (user_control_style( )), where each user control style is configure to change at least one of the region presentation properties speicified by a corresponding region style. By selecting one of the set of user control styles, a user is able to change the region style of each region in a very simple manner. However, if all the properties specified by the region style are changeable by a user, the display control of a dialog by the user may be very difficult. For this reason, the region presentation properties that are changeable by a user control style may be limited to at least one of the region horizontal position, region vertical position, font size, text horizontal position, text vertical position, and line space.

According to FIG. 9B and FIG. 9C, a set of user control styles are defined for each region style having a region style ID, and user style IDs (user_style_id) are assigned to the set of user control styles, respectively. The maximum number of the user control styles defined for each region style may be limited to 25. Since the maximum number of the region styles defined in a dialog style set is limited to 60, the total number of the user changeable styles defined for a DPU must be less than or equal to 1500.

Referring to FIG. 9C, in order to change the region horizontal position, a user control style may include a region horizontal position direction (region_horizontal_position_direction) specifying the direction of the region horizontal position's horizontal movement and a region horizontal position delta (region_horizontal_position_delta) specifying the number of the horizontal movement in the unit of pixels. For example, the horizontal movement may be in a right direction if the horizontal position direction is set to 0 and may be in a left direction if it is set to 1. In order to change the region vertical position, a user control style may include a region vertical position direction (region_vertical_position_direction) specifying the direction of the region horizontal position's vertical movement and a region vertical position delta (region_vertical_position_delta) specifying the number of the vertical movement in the unit of pixels. For example, the vertical movement may be in a downward direction if the vertical position direction is set to 0 and may be in a upward direction if it is set to 1. Furthermore, in order to change the font size defined by a region style with a region style ID, a user control style may include a font size change direction (font_size_inc_dec) specifying the direction of the font size change, and a font size delta (font_size_delta) specifying the number of the font size change in unit of pixels. For example, the font size may be increased if font_size_inc_dec is set to 0 and may be decreased if it is set to 1.

Some of the characteristic features of the user changeable style set according to the present invention are as follows. First, a set of user control styles are defined for each of a set of region styles defined in a dialog style unit, and the number of the set of control styles are fixed. Therefore, the numbers of the user control styles defined for two different region styles, respectively, are identical. The number of the set of user control styles to be used when reproducing each region of dialog text is fixed. Next, the set of user control styles are identified by different user style IDs, respectively. Third, all the changes in the region presentation properties are defined in combination by a single user control style. For example, the region horizontal position and font size are not changed separately by two distinct user control styles. They are changed in combination by a single user control style. Fourth, a change of a certain property is represented with its direction and magnitude rather than with an actual property value. The actual property value may be obtained by applying the magnitude (delta) and direction of the change to the original property value defined in a region style.

In conclusion, when an author records main AV streams in an optical disc, the author also records at least one text subtitle stream. Each text subtitle stream includes a DSU defining a set of dialog styles and a plurality of DPUs. The set of region styles have different region style IDs. The DSU further defines a set of user control styles for each region style, where the user control styles have different user style IDs. Each user control style is configured to change at least one of the author-defined region presentation properties which are specified by a corresponding region style. In addition, the dialog style set includes a player style flag indicating whether the author permitted a player to generate and/or use its own set of player styles for a text subtitle in additional to the author-defined style set.

Figure 10:
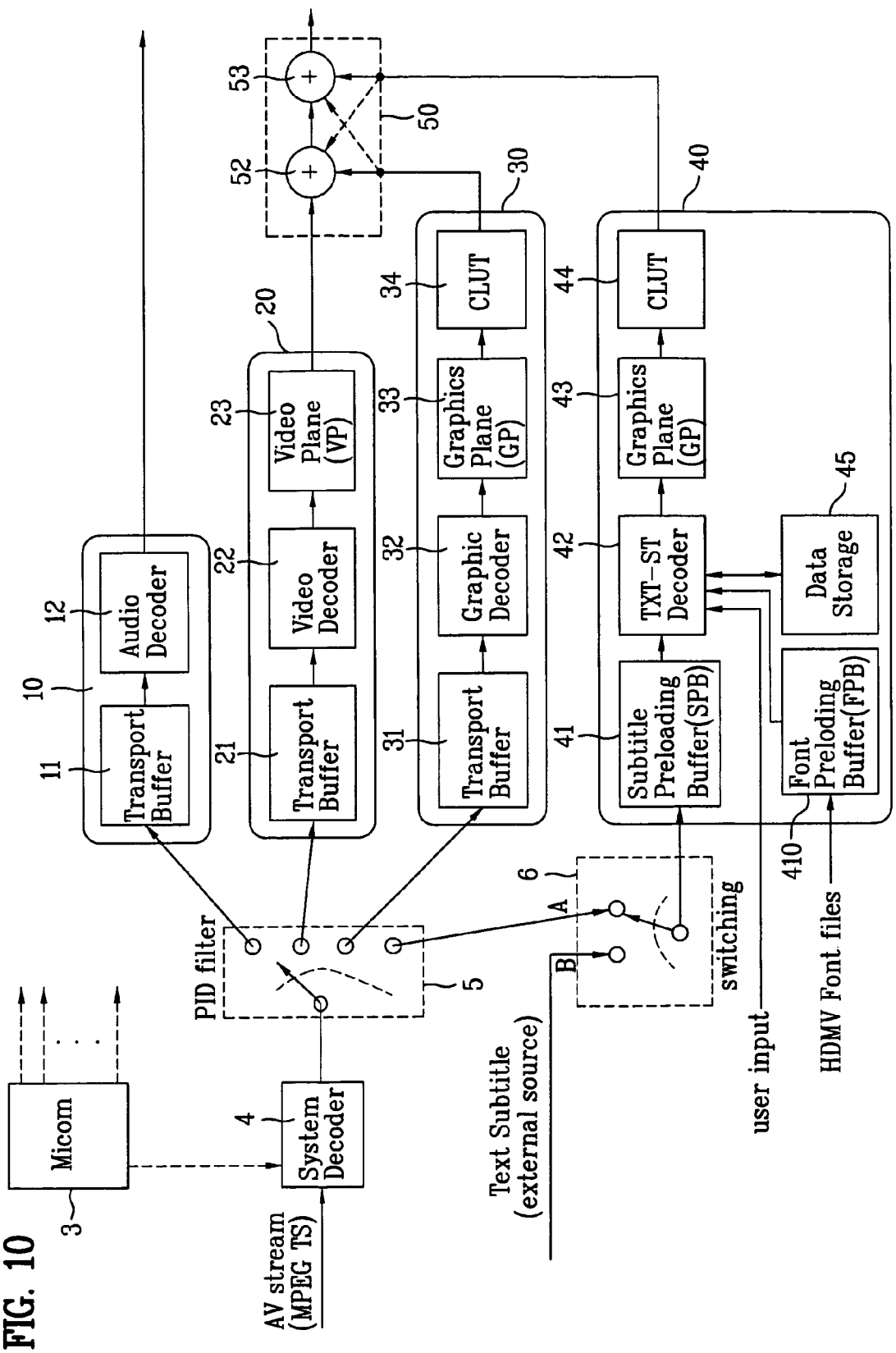
FIG. 10 illustrates an example of the apparatus for decoding main AV streams and text subtitle streams according to the present invention.

Reference will now be made in detail to an apparatus for decoding man AV streams and text subtitle streams according to the present invention, an example of which is illustrated in FIG. 10. The apparatus includes a packet identifier (PID) filter 5 for separating input streams into video streams, audio streams, graphic streams, and text subtitle streams based on their packet identifiers, a video decoding part 20 for decoding the video streams, an audio decoding part 10 for decoding the audio streams, a graphic decoding part 30 for decoding the graphic streams, and a text subtitle decoding part 40 for decoding the text subtitle streams.

The text subtitle streams may be extracted from an optical disc or from an additional external source, as shown in FIG. 10. For this reason, the apparatus additionally includes a switch 6 which selects an input data source. Therefore, if the text subtitle streams are extracted from the optical disc, the switch 6 selects data line A connected to the PID filter 5. On the other hand, if they are inputted from the external source, the switch 6 selects line B connected to the external source.

Referring back to FIG. 10, the audio decoding part 10, video decoding part 20, and graphic decoding part 30 include transport buffers 11, 21, and 31, respectively, for storing stream data to be decoded. A video plane (VP) 23 and a graphic plane 33 are included in the video decoding part 20 and the graphic decoding part 30, respectively, for converting decoded signals into displayable video and graphic images. The graphic decoding part 30 includes a color look up table (CLUT) 34 for controlling color and transparency levels of the displayable graphic images.

When the text subtitle decoding part 40 receives a text subtitle stream supporting a single language from the switch 6, an entire portion of the text subtitle stream may be pre-loaded into a subtitle preloading buffer (SPB) 41 at once. Alternatively, when there are more than one text subtitle streams for supporting multi-languages, all the text subtitle streams may be preloaded into the SPB 41 at once. Therefore, the size of the SPB 41 should be determined based on a total number of text subtitle stream files received from the switch 6. For example, the size of the SPB 41 should be greater than or equal to 0.5 megabytes for preloading a 0.5 megabyte text subtitle stream file. In addition, in order to ensure seamless presentation of a text subtitle when a user switches among two 0.5 megabyte text subtitle stream files, the size of the SPB 41 should be greater than or equal to 1 megabytes. The size of the SPB 41 should be large enough to preload all the required text subtitle stream files at once.

The text subtitle decoding part 40 shown in FIG. 10 further includes a font preloading buffer (FPB) 410 for storing all the associated font files which may be included in the auxiliary data directory shown in FIG. 1. Similarly, the size of the FPB 410 should be large enough to preload all the required font files at once in order to ensure seamless presentation of a text subtitle supporting one or more languages. Since all the available text subtitle stream files and related font files are pre-loaded, extraction and use of the preloaded data can be done in a simple manner. Also the control of the SPB 41 and the FPB 410 could be quite simple due to the this reason. The text subtitle decoding part 40 further includes a text subtitle decoder 42 which decodes each text subtitle stream stored in the SPB 41, a graphic plane 43 in which the decoded subtitle data are composed as displayable subtitle images, and a color look up table (CLUT) 44 controlling at least one of color and transparency levels of the converted subtitle images.

The text subtitle decoding part 40 further includes a local data storage 45 which stores a player style set defining a set of player styles to be selectively used when reproducing a text subtitle stream preloaded in the SPB 41. In addition, the local data storage 45 may further store a user changeable set specifying a set of user control styles to be selectively used when reproducing the text subtitle stream. This user changeable set may be similar to the user changeable set included in a DSU, an example of which is shown in FIG. 9C.

In first aspect of the present invention, each player style represents a region style specifying a complete set of region presentation properties for a region of dialog text, examples of which are a region horizontal position, region vertical position, region width, region height, region background color index, text horizontal position, text vertical position, text flow, text alignment, line space, font identification, font style, font size, and font color index. In this case, the set of player styles stored in the local data storage 45 is used independent of a set of region styles defined in a DSU.

In second aspect of the present invention, each player style is configured to redefine at least one of region presentation properties which are initially defined by a region style defined in a DSU. For example, if a region style defined in the DSU defines a complete set of region presentation properties including font identification and a player style redefines the font identification, then the redefined font identification and all other properties specified by the region style are used in combination.

In third aspect of the present invention, each player style may be configured to change at least one of region presentation properties which are initially defined by a region style defined in a DSU. For example, a player style may specify a direction and a magnitude of a change in a region horizontal position defined in the region style. In this case, the player style set is similar to the user changeable set, an example of which is illustrated in FIG. 9C.

Figure 11:
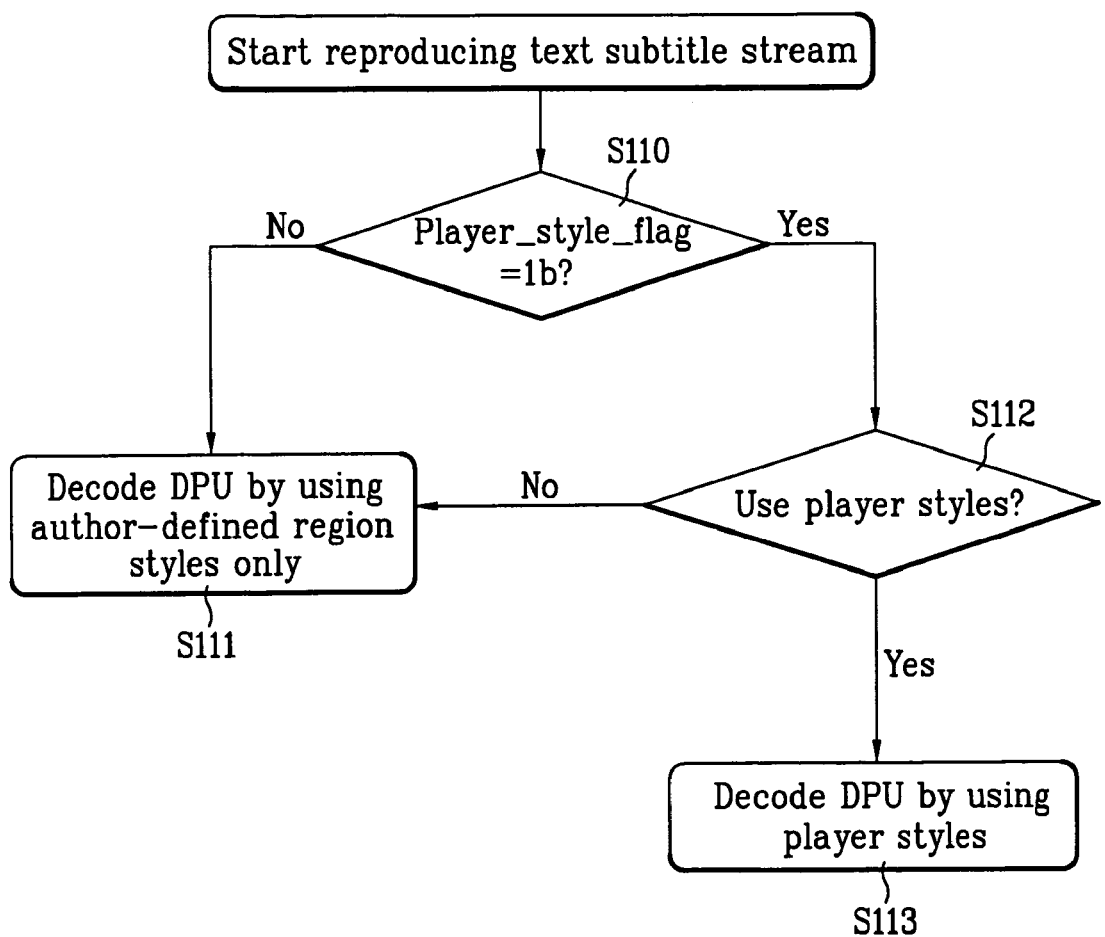
FIG. 11 illustrates an example of the method for decoding a text subtitle stream recorded on an optical disc according to the present invention.

FIG. 11 illustrates a method of decoding a text subtitle stream recorded on an optical disc according to an example of the present invention. After the text subtitle decoder 42 starts reproducing a text subtitle stream preloaded into the SPB 41, it initially reads player_style_flag included in a DSU to determine whether the use of a player style set stored in the local data storage 45 is permitted (S110). For example, if player_style_flag is set to 0b, use of the player style set is not permitted. In this case, the text subtitle decoder 42 must use the author-defined region styles recorded on the optical disc (S111). On the other hand, if player_style_flag is set to 1b, the text subtitle decoder 42 is permitted to use the player style set stored in the local data storage 45. Then the text subtitle decoder 42 independently determines whether to use any one of a set of player styles defined in the player style set (S112). For example, the text subtitle decoder 42 may compare the set of player styles with the region styles defined in the text subtitle stream and use a result of this comparison for the determination of step S112. If the set of player styles are not determined to be used in step S112, the region styles recorded on the optical disc are used (S111). On other hand, if the set of player styles are determined to be used in step S112, the text subtitle decoder 42 may use them independently or in combination with the set of region styles recorded on the disc.

In addition, when the text subtitle decoder 42 decodes a DPU, it may use a region style identified by a region style identifier included in the DPU. If a user wises to change this region style, he or she may input a command for changing the region style. By selecting one of a set of user control styles, which are defined by a user-changeable style set defined in a DSU, at least one of the region horizontal position, region vertical position, and font size may be changed.

The apparatus shown in FIG. 10 further includes an image superimposition part 50 which superimposes the images outputted from the video decoding part 20, the graphic decoding part 30, and the text subtitle decoding part 40. These combined images are displayed on a display screen, as shown in FIG. 3. In general, the video images outputted from the VP 23 of the video decoding part 20 may be displayed as a background of the display screen, and the images outputted from the graphic decoding part 30 and/or text subtitle decoding part 40 may be superimposed over the video images in a predetermined order. For example, if the output images of the graphic decoding part 30 are presentation graphic images, these images may be initially superimposed over the video images by a first adder 52, and subsequently, the text subtitle images from the text subtitle decoding part 40 may be superimposed over the video images by a second adder 53. However, if the output images of the graphic decoding part 30 are interactive graphic images, the text subtitle images from the text subtitle decoding part 40 may be initially superimposed over the video images by the first adder 52. Thereafter, the interactive graphic images may be further superimposed over the subtitle-superimposed images by the second adder 53.

Lastly, the apparatus shown in FIG. 10 further includes a system decoder 4 for decoding input transport streams (e.g., MPEG transport streams), and a microprocessor 3 for controlling operations of all the components of the apparatus mentioned above.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

According to the present invention, a text subtitle stream includes a dialog style segment defining a set of author-defined styles and at least one dialog presentation segment, each of which containing at least one region of dialog text. The dialog style segment includes a player style flag indicating whether a player is permitted to generate and/or use its own set of player styles. Therefore, the player is able to use the set of player styles in additional to the set of author-defined region styles if it is permitted, each region of dialog text being decoded for presentation can have a variety of region styles.

What is claimed is:

1. A computer-readable medium storing at least one text subtitle stream, the at least one text subtitle stream comprising:
   a stream area for storing at least one text subtitle stream including a style segment defining styles and at least one presentation segment,
   each presentation segment containing at most two regions of text,
   each region being linked to at least one of the styles defined in the style segment by a region style identifier identifying the styles defined in the style segment,
   wherein the style segment includes a player style flag which indicates whether a player is permitted to generate its own player styles for decoding the at least one text subtitle stream,
   wherein each player style represents a region style specifying an independent set of region presentation properties for a region of text.

2. The computer-readable medium of claim 1, wherein the styles defined in the style segment includes at least one region style and a data field indicating a number of region styles.

3. The computer-readable medium of claim 2, wherein the number of region styles included in styles is less than or equal to 60.

4. The computer-readable medium of claim 1, wherein a value of the player style flag is 1 to indicate that the player is permitted to generate its own player styles.

5. The computer-readable medium of claim 1, wherein a value of the player style flag is 0 to indicate that the player is prohibited from generating its own player styles.

6. The computer-readable medium of claim 1, wherein the player styles are stored in a local data storage included in the player.

7. The computer-readable medium of claim 1, wherein each player style is configured to redefine at least one of region presentation properties specified by the linked style.

8. The computer-readable medium of claim 1, wherein each player style is configured to change at least one of region presentation properties specified by the linked style.

9. The computer-readable medium of claim 8, wherein each player style specifies a direction and a magnitude of a change in the at least one of region presentation properties.

10. The computer-readable medium of claim 1, wherein the player style flag cannot be set by the player.

11. A method for decoding a text subtitle stream recorded on a computer-readable medium, the method comprising:
   loading the text subtitle stream into a subtitle loading buffer, the loaded text subtitle stream including a style segment defining styles and at least one presentation segment,
   wherein each presentation segment contains at most two regions of text,
   each region being linked to at least one of the styles defined in the style segment by a region style identifier identifying the styles defined in the style segment;
   reading a player style flag included in the style segment to determine whether a player is permitted to generate its own player styles; and
   decoding the text subtitle stream using the player styles if the permission is indicated as allowed by the player style flag,
   wherein each player style represents a region style specifying an independent set of region presentation properties for a region of text.

12. The method of claim 11, wherein the styles defined in the style segment include at least one region style.

13. The method of claim 11, wherein each player style represents a region style specifying an independent set of region presentation properties for a region of dialog text.

14. The method of claim 11, wherein each player style is configured to redefine at least one of region presentation properties specified by the linked style.

15. The method of claim 11, wherein each player style is configured to change at least one of region presentation properties specified by the linked style.

16. The method of claim 15, wherein each player style specifies a direction and a magnitude of a change in the at least one of region presentation properties.

17. The method of claim 11, further comprising:
determining whether to use player styles if the permission is indicated as allowed by the player style flag.

18. The method of claim 11, further comprising:
storing player styles in a local data storage.

19. An apparatus for decoding a text subtitle stream recorded on a computer-readable medium, the apparatus comprising:
a microprocessor;
a data storage unit;
a subtitle loading buffer configured to load the text subtitle stream,
the loaded text subtitle stream including a style segment defining styles and at least one presentation segment,
each presentation segment containing at most two regions of text,
each region being linked to at least one of the styles defined in the style segment by a region style identifier identifying the styles defined in the style segment; and
a text subtitle decoder configured to read a player style flag included in the style segment to determine whether a player is permitted to generate its own player styles,
wherein if the permission is indicated as allowed by the player style flag,
the text subtitle decoder decodes the text subtitle stream using the player styles generated by the player,
wherein each player style represents a region style specifying an independent set of region presentation properties for a region of text.

20. The apparatus of claim 19, wherein the subtitle loading buffer is configured to load the text subtitle stream, the text subtitle stream including the style segment defining the styles which are a user-defined region styles.

21. The apparatus of claim 19, further comprising:
a local data storage configured to store the player styles.

\* \* \* \* \*